United States Patent
Watanabe

(10) Patent No.: US 10,170,757 B2
(45) Date of Patent: Jan. 1, 2019

(54) NEGATIVE ELECTRODE MATERIAL FOR LITHIUM ION SECONDARY BATTERY, NEGATIVE ELECTRODE, AND LITHIUM ION SECONDARY BATTERY

(71) Applicant: SHIN-ETSU CHEMICAL CO., LTD., Tokyo (JP)

(72) Inventor: Koichiro Watanabe, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/116,872

(22) PCT Filed: Nov. 28, 2014

(86) PCT No.: PCT/JP2014/081527
§ 371 (c)(1),
(2) Date: Aug. 5, 2016

(87) PCT Pub. No.: WO2015/118755
PCT Pub. Date: Aug. 13, 2015

(65) Prior Publication Data
US 2017/0179476 A1    Jun. 22, 2017

(30) Foreign Application Priority Data

Feb. 6, 2014 (JP) .................................. 2014-020954

(51) Int. Cl.
| | | |
|---|---|---|
| H01M 4/36 | (2006.01) |
| H01M 4/04 | (2006.01) |
| H01M 4/48 | (2010.01) |
| H01M 4/62 | (2006.01) |
| H01M 10/0525 | (2010.01) |
| H01M 4/1391 | (2010.01) |
| H01M 4/02 | (2006.01) |

(52) U.S. Cl.
CPC ......... *H01M 4/366* (2013.01); *H01M 4/0471* (2013.01); *H01M 4/483* (2013.01); *H01M 4/625* (2013.01); *H01M 10/0525* (2013.01); *H01M 4/0428* (2013.01); *H01M 4/1391* (2013.01); *H01M 2004/021* (2013.01); *H01M 2004/027* (2013.01)

(58) Field of Classification Search
CPC ....... H01M 10/0525; H01M 2004/021; H01M 2004/027; H01M 4/0471; H01M 4/366; H01M 4/483; H01M 4/625
See application file for complete search history.

(56) References Cited

U.S. PATENT DOCUMENTS

| | | |
|---|---|---|
| 5,478,671 A | 12/1995 | Idota |
| RE35,818 E | 6/1998 | Tahara et al. |
| 6,066,414 A | 5/2000 | Imoto et al. |
| 6,383,686 B1 | 5/2002 | Umeno et al. |
| 6,638,662 B2 | 10/2003 | Kaneda et al. |
| 2009/0239151 A1* | 9/2009 | Nakanishi ........... H01M 4/0428 429/231.95 |
| 2013/0045419 A1 | 2/2013 | Chun et al. |

FOREIGN PATENT DOCUMENTS

| | | |
|---|---|---|
| EP | 2559660 A1 | 2/2013 |
| JP | 5-174818 A | 7/1993 |
| JP | 6-060867 A | 3/1994 |
| JP | 10-294112 A | 11/1998 |
| JP | 11-102705 A | 4/1999 |
| JP | 2997741 B2 | 1/2000 |
| JP | 2000-215887 A | 8/2000 |
| JP | 2000-243396 A | 9/2000 |
| JP | 2002-042806 A | 2/2002 |
| JP | 2009-205950 A | 9/2009 |
| JP | 2013-041826 A | 2/2013 |
| WO | WO 2013/164914 A1 | 11/2013 |

OTHER PUBLICATIONS

International Search Report (PCT/ISA/210) issued in PCT/JP2014/081527, dated Feb. 17, 2015.
Extended European Search Report, dated Jun. 9, 2017, for European Application No. 14882077.2.

* cited by examiner

*Primary Examiner* — Miriam Stagg
*Assistant Examiner* — Victoria H Lynch
(74) *Attorney, Agent, or Firm* — Birch, Stewart, Kolasch & Birch, LLP

(57) ABSTRACT

Provided is a negative electrode material that is suitable for use in a negative electrode of a lithium ion secondary battery having high capacity and excellent cycle characteristics. Also provided are a negative electrode and a lithium ion secondary battery using the same.
The negative electrode material for lithium ion secondary battery comprises a particle that contains silicon and is capable of storing and releasing a lithium ion and that is characterized, in a volume-based distribution as measured with a laser diffraction particle size distribution meter, by (mode diameter—$D_{50}$)/$D_{50}$=0.13 or greater and ($D_{90}$—mode diameter)/$D_{90}$=0.28 or less, where the mode diameter is the most frequent value in the distribution, $D_{50}$ is the diameter at 50% accumulation and $D_{90}$ is the diameter at 90% accumulation.

10 Claims, 2 Drawing Sheets

NEGATIVE ELECTRODE MATERIAL FOR LITHIUM ION SECONDARY BATTERY, NEGATIVE ELECTRODE, AND LITHIUM ION SECONDARY BATTERY

TECHNICAL FIELD

This invention relates to a negative electrode material for a lithium ion secondary battery which, when used as a negative electrode active material in lithium ion secondary batteries, exhibits a high initial charge-discharge efficiency and a high capacity, and moreover has good cycle characteristics. The invention additionally relates to a negative electrode and a lithium ion secondary battery in which such an electrode material has been used.

BACKGROUND ART

The striking growth recently in mobile electronic devices, communications devices and the like has been accompanied by a strong desire, from the standpoint of economics and the trend toward smaller and lighter weight devices, for secondary batteries having a high energy density.

Hitherto known approaches for increasing the capacity of this type of secondary battery include, for example, methods which use oxides of vanadium, silicon, boron, zirconium, tin or the like, and complex oxides thereof, as the negative electrode material (see, for example, Patent Documents 1 and 2); methods which use melt-quenched metal oxides as the negative electrode material (see, for example, Patent Document 3), methods which use silicon oxide as the negative electrode material (see, for example, Patent Document 4), and methods which use $Si_2N_2O$ and $Ge_2N_2O$ as the negative electrode material (see, for example, Patent Document 5).

To impart the negative electrode material with electrical conductivity, there are also methods that involve the mechanical alloying of SiO with graphite followed by carbonization (see, for example, Patent Document 6), methods wherein the surface of silicon particles is coated with a carbon layer by chemical vapor deposition (see, for example, Patent Document 7), and methods wherein silicon oxide particles are coated on the surface with a carbon layer by chemical vapor deposition (see, for example, Patent Document 8).

However, although these conventional methods do increase the charge-discharge capacity and raise the energy density, the cycle characteristics are inadequate or the battery continues to fall short in terms of the properties desired by the market and so is not always satisfactory. Hence, there has existed a desire for further improvement in the energy density.

In particular, in Patent Document 4, a high-capacity electrode is obtained by using silicon oxide as the negative electrode material for a lithium ion secondary battery. However, to the inventor's knowledge, drawbacks include a large irreversible capacity during initial charge-discharge and cycle properties that have not achieved a practical level. Hence, there remains room for improvement.

As for the art that has imparted electrical conductivity to the negative electrode material, in Patent Document 6, on account of solid-to-solid fusion, a uniform carbon coat does not form, resulting in a poor electrical conductivity.

In the method of Patent Document 7, although a uniform carbon coat can be formed, because silicon is used as the negative electrode material, the swelling and shrinkage during lithium ion intercalation and deintercalation are so large that the coat is unable as a result to withstand practical use, and so the cycle characteristics decrease. To prevent this from happening, a limit must thus be set to the amount of charging. In the method of Patent Document 8, although an improvement in the cycle characteristics has been confirmed, owing to the precipitation of fine silicon crystals, the structure of the carbon coating and inadequate fusion with the substrate, as the number of charge-discharge cycles increases, the capacity gradually declines and, after a given number of cycles, drops off sharply. Hence, this art is not yet ready for use in secondary batteries. In light of the above, the development of a negative electrode material for lithium ion secondary batteries which retains the advantages of high battery capacity and low coefficient of cubical expansion inherent to silicon oxide-based materials, yet also has a high initial charge-discharge efficiency and excellent cycle characteristics, and of a method for manufacturing such a material, has been awaited.

PRIOR ART DOCUMENTS

Patent Documents

Patent Document 1: JP-A H05-174818
Patent Document 2: JP-A H06-60867
Patent Document 3: JP-A H10-294112
Patent Document 4: JP No. 2997741
Patent Document 5: JP-A H11-102705
Patent Document 6: JP-A 2000-243396
Patent Document 7: JP-A 2000-215887
Patent Document 8: JP-A 2002-42806

SUMMARY OF THE INVENTION

Problems to be Solved by the Invention

It is therefore an object of the invention to provide a negative electrode material suitable for use in the negative electrode of a lithium ion secondary battery, which material retains the advantage of the low coefficient of cubical expansion of silicon oxide-based materials while also having a high capacity and excellent cycle characteristics. Further objects of the invention are to provide a negative electrode and a lithium ion secondary battery that use such a material.

Means for Solving the Problems

The inventor has discovered that a lithium ion secondary battery having a high capacity and excellent cycle characteristics can be obtained by using, as the negative electrode material (active material) for a lithium ion secondary battery, silicon-containing particles which are capable of intercalating and deintercalating lithium ions and are characterized by having a particle size distribution in a specific range—that is, particles which have a volume base distribution measured with a laser diffraction-type particle size analyzer wherein, letting the mode be the modal diameter, the cumulative 50% diameter be $D_{50}$ and the cumulative 90% diameter be $D_{90}$: (modal diameter—$D_{50}$)/$D_{50}$=0.13 or more and ($D_{90}$—modal diameter)/$D_{90}$=0.28 or less.

Accordingly, the invention provides the following negative electrode material for a lithium ion secondary battery, the following negative electrode, and the following lithium ion secondary battery.

[I] A negative electrode material for use in a lithium ion secondary battery, the material being made of silicon-containing particles which are capable of intercalating and deintercalating lithium ions and are characterized by having a volume base distribution measured with a laser diffraction-type particle size analyzer wherein, letting the mode be the modal diameter, the cumulative 50% diameter be $D_{50}$ and the cumulative 90% diameter be $D_{90}$: (modal diameter—$D_{50}$)/$D_{50}$=0.13 or more and ($D_{90}$—modal diameter)/$D_{90}$=0.28 or less.

[II] A negative electrode for a lithium ion secondary battery, the negative electrode being characterized by using the foregoing negative electrode material for a lithium ion secondary battery.

[III] A lithium ion secondary battery characterized by using the foregoing negative electrode for a lithium ion secondary battery.

Advantageous Effects of the Invention

By using the negative electrode material obtained in this invention as the negative electrode material in a lithium ion secondary battery, it is possible to obtain lithium ion secondary batteries having a high capacity and excellent cycle characteristics. Moreover, rather than being complicated, the method of production is simple and convenient, and is thereby fully amenable to production on an industrial scale.

BRIEF DESCRIPTION OF THE DIAGRAMS

EMBODIMENT FOR CARRYING OUT THE INVENTION

Figure 1:
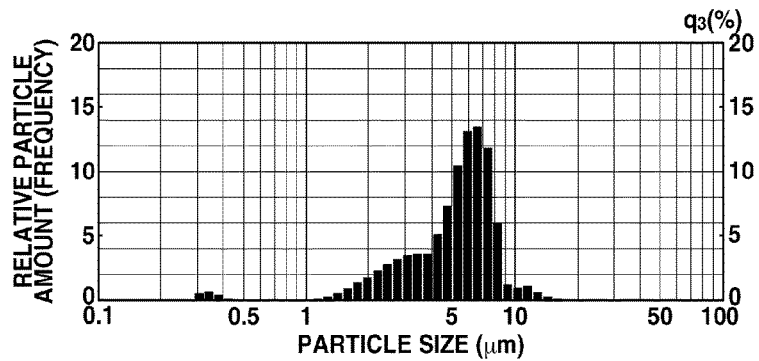
FIG. 1 is a particle size distribution chart for Working Example 1.
Figure 2:
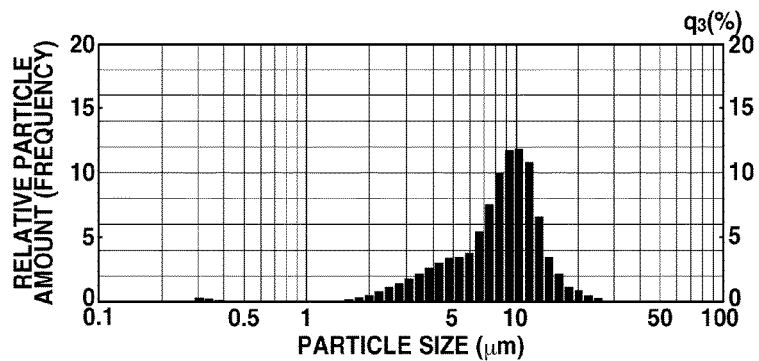
FIG. 2 is a particle size distribution chart for Working Example 2.
Figure 3:
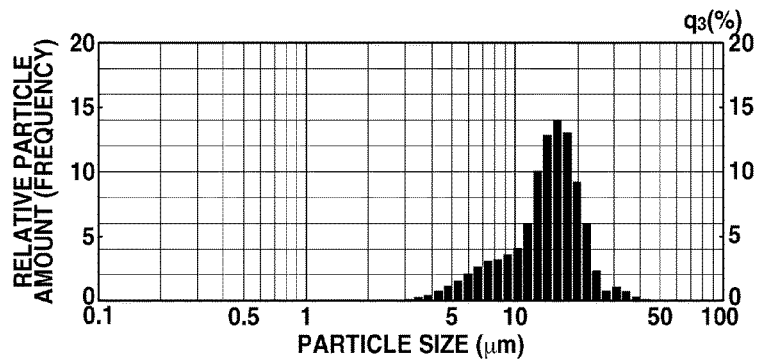
FIG. 3 is a particle size distribution chart for Working Example 3.
Figure 4:
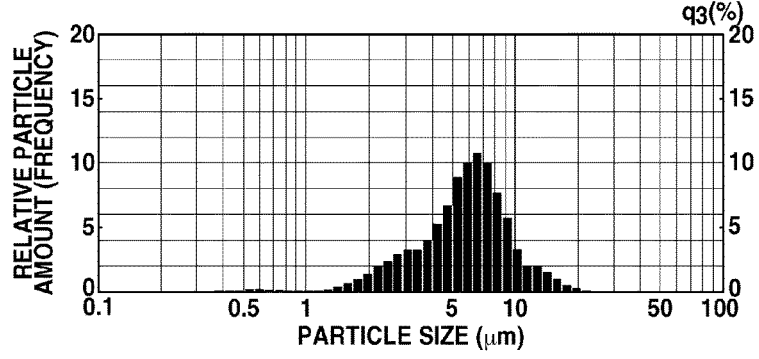
FIG. 4 is a particle size distribution chart for Comparative Example 1.
Figure 5:
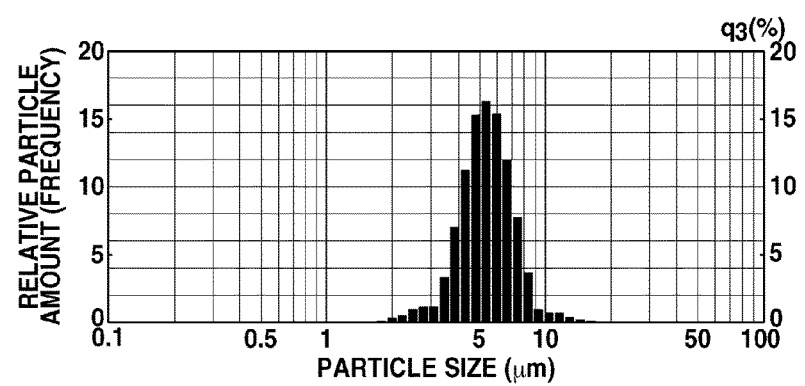
FIG. 5 is a particle size distribution chart for Comparative Example 2.
Figure 6:
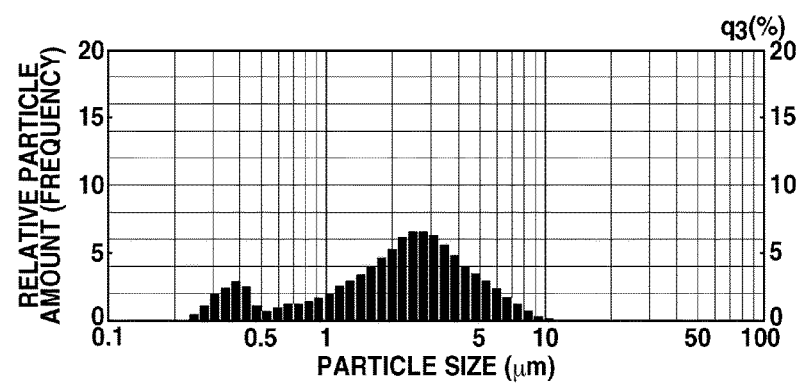
FIG. 6 is a particle size distribution chart for Comparative Example 3.

The invention is described more fully below.

[Negative Electrode Material for Lithium Ion Secondary Battery]

The inventive negative electrode material for a lithium ion secondary battery is made of silicon-containing particles which are capable of intercalating and deintercalating lithium ions and are characterized by having a volume base distribution measured with a laser diffraction-type particle size analyzer wherein, letting the mode be the modal diameter, the cumulative 50% diameter be $D_{50}$ and the cumulative 90% diameter be $D_{90}$: (modal diameter—$D_{50}$)/$D_{50}$=0.13 or more and ($D_{90}$—modal diameter)/$D_{90}$=0.28 or less.

The silicon-containing particles capable of intercalating and deintercalating lithium ions (sometimes referred to below simply as "silicon-containing particles") are preferably silicon particles, particles having a composite structure of silicon fine particles dispersed in a silicon compound, silicon oxide particles of general formula SiOx (wherein 0.5≤x≤1.6), or a mixture thereof. By using these, it is possible to obtain a negative electrode material for lithium ion secondary batteries endowed with a high initial charge-discharge efficiency, a high capacity and excellent cycle characteristics.

In this invention, "silicon oxide" refers generically to amorphous silicon oxide. Silicon oxide before disproportionation is represented by the general formula SiOx (wherein 0.5≤x≤1.6). Preferably, 0.8≤x<1.6; more preferably, 0.8≤x<1.3. This silicon oxide can be obtained by, for example, cooling and precipitating silicon monoxide gas produced by heating a mixture of silicon dioxide and metallic silicon.

Particles having a composite structure in which silicon fine particles are dispersed in a silicon compound can be obtained by, for example, a method that involves firing a mixture of silicon fine particles and a silicon compound, or by heat-treating silicon oxide particles before disproportionation that are represented by the general formula SiOx in an inert non-oxidizing atmosphere such as argon at a temperature of at least 400° C., and preferably from 800 to 1,100° C., so as to carry out a disproportionation reaction. In particular, materials obtained by the latter method are suitable for uniformly dispersing fine crystals of silicon. With such a disproportionation reaction, the size of silicon nanoparticles can be set to from 1 to 100 nm. It is desirable for the silicon oxide in particles having a structure of silicon nanoparticles dispersed in silicon oxide to be silicon dioxide. Transmission electron microscopy can be used to confirm that the silicon nanoparticles (crystals) are dispersed in amorphous silicon oxide.

The physical properties of the silicon-containing particles can be suitably selected in accordance with the target compound particles. For example, the average particle size is preferably from 0.1 to 50 μm, with the lower limit being more preferably at least 0.2 μm and even more preferably at least 0.5 μm. The upper limit is more preferably 30 μm or less, and even more preferably 20 μm or less. In this invention, "average particle size" is expressed as the cumulative 50% diameter $D_{50}$ within the volume base distribution in particle size analysis by the laser diffraction method.

The BET specific surface area is preferably from 0.5 to 100 $m^2$/g, and more preferably from 1 to 20 $m^2$/g. At a BET specific surface area of 0.5 $m^2$/g or more, there is no danger of a decrease in the adhesion following application to the electrode and of a consequent decrease in the battery characteristics. On the other hand, by setting the BET specific surface area to 100 $m^2$/g or less, the proportion of silicon dioxide on the particle surface increases, making it possible to eliminate the possibility of a decrease in battery capacity when these particles are used as a negative electrode material for a lithium ion secondary battery.

Methods aimed at imparting electrical conductivity to the silicon-containing particles and improving the battery characteristics include the method of mixing in particles of graphite or the like having electrical conductivity, the method of coating the surface of the above composite particles with a carbon coat, and methods that combine both approaches. of these, the use of coated particles obtained by coating the surface of the silicon-containing particles capable of intercalating and deintercalating lithium ions with a carbon coat is preferred. The method of coating with a carbon coat is preferably a chemical vapor deposition (CVD) process.

The chemical vapor deposition (CVD) process is exemplified by a method that entails, when obtaining coated particles consisting of silicon-containing particles capable of intercalating and deintercalating lithium ions that are coated on the surface with a carbon coat, chemical vapor depositing carbon onto silicon-containing particles capable of intercalating and deintercalating lithium ions, in an atmosphere of an organic gas and/or vapor that is capable of thermally decomposing to produce carbon and within a temperature range of 600 to 1,200° C., preferably from 900 to 1,100° C., so as to form a carbon coat.

Chemical vapor deposition (CVD) may be carried out either at normal pressure or under reduced pressure. When carried out under reduced pressure, the reduced pressure may be, for example, from 50 to 30,000 Pa. The apparatus used in the carbon coat-forming step may be a commonly known apparatus such as a batch furnace, a rotary kiln, the type of continuous furnace known as a roller-hearth kiln, or a fluidized bed. In cases where the vapor deposition system is a batch furnace that carries out CVD with the particles at rest, by carrying out the operation under reduced pressure, the carbon can be more uniformly coated, enabling the battery characteristics to be improved.

A variety of organic materials, including those mentioned below, may be used as the carbon source to form the carbon coat by chemical vapor deposition, although the thermal decomposition temperature, deposition rate, and properties of the resulting carbon coat following vapor deposition may differ considerably depending on the substance used. Substances having a large deposition rate often result in a carbon coat uniformity at the surface that is less than satisfactory. On the other hand, in cases where a high temperature is required for decomposition, the silicon crystals in the particles to be coated may grow too large during high-temperature vapor deposition, which may lead to declines in the discharge efficiency and the cycle characteristics.

Illustrative examples of organic gas precursors capable of thermally decomposing to produce carbon include hydrocarbons such as methane, ethane, ethylene, acetylene, propane, butane, butene, pentane, isobutane and hexane; monocyclic to tricyclic aromatic hydrocarbons such as benzene, toluene, xylene, styrene, ethylbenzene, diphenylmethane, naphthalene, phenol, cresol, nitrobenzene, chlorobenzene, indene, coumarone, pyridine, anthracene and phenanthrene; and gas light oil, creosote oil, anthracene oil and naphtha cracking tar oil obtained in tar distillation operations. These may be used singly, or two or more may be suitably selected and used together.

The coating weight of the carbon coat, based on the overall carbon-coated particle, is preferably from 0.3 to 40 wt %, and more preferably 1.0 to 30 wt %. Although much depends also on the particles to be coated, by setting the carbon coating weight to at least 0.3 wt %, an electrical conductivity that is generally sufficient can be maintained, making it possible to reliably achieve an improvement in the cycle characteristics when the coated particles have been rendered into a negative electrode for a nonaqueous electrolyte secondary battery. Also, setting the carbon coating weight to not more than 40 wt % minimizes the possibility of situations arising in which the proportion of carbon in the negative electrode material becomes higher with no apparent improvement in the effects, and the charge-discharge capacity when this material is used as a negative electrode material for lithium ion secondary batteries decreases.

The inventive particles have a specific particle size range such that, letting the cumulative 50% diameter be $D_{50}$ and the cumulative 90% diameter be $D_{90}$: (modal diameter—$D_{50}$)/$D_{50}$=0.13 or more and ($D_{90}$—modal diameter)/$D_{90}$=0.28 or less. By setting the particle size in this range, a particle size distribution without left-right symmetry is obtained in which the foot of the distribution curve on the coarse product side is short and the foot of the distribution curve on the fine product side is long. When (modal diameter—$D_{50}$)/$D_{50}$ is less than 0.13, the cycle characteristics are inadequate and sufficient packing density is not obtained in the electrode. The (modal diameter—$D_{50}$)/$D_{50}$ value is preferably from 0.13 to 0.50, more preferably from 0.15 to 0.35, and even more preferably from 0.25 to 0.33. When ($D_{90}$—modal diameter)/$D_{90}$ is larger than 0.28, the cycle characteristics are inadequate and coating onto an electrode is difficult. Particularly in the case of particles for which $D_{90}$ is more than 15 μm, coarse particles become present and may scratch the separator. The value ($D_{90}$—modal diameter)/$D_{90}$ is preferably from 0.05 to 0.28, more preferably from 0.05 to 0.20, and even more preferably from 0.08 to 0.18. Also, $D_{50}$ is preferably from 0.1 to 20 μm, more preferably from 0.5 to 15 μm, and even more preferably from 1 to 10 μm; $D_{90}$ is preferably from 5 to 25 μm, more preferably from 5 to 15 μm, and even more preferably from 7 to 11 μm; and the modal diameter is preferably from 5 to 20 μm. In this invention, "$D_{50}$" refers to the cumulative 50% diameter and "$D_{90}$" refers to the cumulative 90% diameter in the volume base distribution in particle size analysis by the laser diffraction method.

To set the negative electrode material in the specific particle size range of the invention, the particle size may be suitably adjusted by treatment such as grinding and classification and also, when forming a carbon coat, by such means as the coating weight. A well-known apparatus may be used for grinding. For example, use can be made of a ball mill or media agitating mill which causes a grinding medium such as balls or beads to move and uses the impact forces, frictional forces and compressive forces due to such movement energy to grind the material being treated; a roller mill which uses the compressive forces of rollers to carry out grinding; a jet mill which causes the material being treated to impinge with an inner lining of the mill at high speed or causes particles of the material being treated to collide with one another, achieving comminution by the impact forces of such collisions; a hammer mill, pin mill or disk mill which utilizes impact forces generated by the rotation of a rotor to which are attached hammers, blades, pins or the like to grind the material being treated; a colloid mill which utilizes shear forces; or a high-pressure wet-type opposed impingement dispersion mill ("Ultimaizer"). Both wet and dry systems may be used for grinding. With grinding alone, the particle size distribution becomes broad; that is, a distribution in which the modal diameter and $D_{90}$ have diverged tends to arise. In addition, dry classification, wet classification or screening classification may be used to adjust the particle size distribution after grinding. In dry classification, dispersion, separation (separation of fine particles and coarse particles), collection (solid and gas separation) and discharging processes are carried out consecutively or simultaneously using primarily a stream of air. Prior to classification, pretreatment (to adjust the moisture content, dispersibility, humidity, etc.) is carried out so as to keep the efficiency of classification from being lowered by the effects of, for example, interference between particles, particle shape, airflow turbulence and velocity distribution, and static electricity; also, the moisture content and oxygen concentration in the stream of air to be used are adjusted. In dry-type systems such as cyclones in which a classifier is an integral part of the system, grinding and classification are carried out at the same time, enabling the desired particle size distribution to be obtained. In order for ($D_{90}$—modal diameter)/$D_{90}$≤0.28 in this invention to be achieved, it is effective to cut off the coarse product side of the distribution with a classifier or sieve after grinding.

The invention uses the above particles in a negative electrode material (active material) for a lithium ion secondary battery. By using the negative electrode material for a lithium ion secondary battery obtained in the invention, a negative electrode can be fabricated and a lithium ion secondary battery can be produced.

[Negative Electrode]

When the above negative electrode material for a lithium ion secondary battery is used to fabricate a negative electrode, a conductive material such as carbon or graphite may also be added. Here too, the type of conductive material is not particularly limited, so long as it is a material that has electron conductivity and does not cause decomposition or deterioration in the constructed battery. For example, use can be made of metal particles and metal fibers of, for example, aluminum, titanium, iron, nickel, copper, zinc, silver, tin or silicon, natural graphite, synthetic graphite, various types of coke particles, mesophase carbon, vapor phase-grown carbon fibers, pitch-based carbon fibers, PAN-based carbon fibers and graphite such as various types of fired resins.

Preparation of a negative electrode (molded body) is exemplified by the following method.

A solvent such as N-methylpyrrolidone or water is worked together with the above negative electrode material and, if necessary, a conductive material and other additives such as a binder (e.g., polyimide resin) to form a paste-like composition, and the composition is coated onto a current collector sheet. In this case, the current collector, provided it is a material such as copper foil or nickel foil that is commonly used as a current collector in negative electrodes, may be used without particular limitation as to thickness and surface treatment.

The method used to mold the composition into a sheet is not particularly limited, and may be a known method.

[Lithium Ion Secondary Battery]

A lithium ion secondary battery has at least a positive electrode, a negative electrode and a nonaqueous electrolyte with lithium ion conductivity. The negative electrode material for lithium ion secondary batteries of the invention is used in the negative electrode. The lithium ion secondary battery of the invention is characterized by having a negative electrode in which a negative electrode material made of the above-described coated particles has been used. The materials making up other battery components, such as the positive electrode, electrolyte and separator, as well as the battery shape, etc., are not particularly limited; use may be made of any that are known. As explained above, the negative electrode material of the invention has good battery characteristics (charge-discharge capacity and cycle characteristics) when used as a negative electrode material for a lithium ion secondary battery, with the cycle life being particularly outstanding.

Transition metal oxides such as $LiCoO_2$, $LiNiO_2$, $LiMn_2O_4$, $V_2O_5$, $MnO_2$, $TiS_2$ and $MoS_2$, lithium, chalcogen compounds and the like may be used as the positive electrode active material.

Nonaqueous solutions containing lithium salts such as lithium hexafluorophosphate or lithium perchlorate may be used as the electrolyte. Nonaqueous solvents that may be used include any one or combination of two or more of the following: propylene carbonate, ethylene carbonate, diethyl carbonate, dimethoxyethane, γ-butyrolactone and 2-methyltetrahydrofuran. Use can also be made of various nonaqueous electrolytes and solid electrolytes other than these.

EXAMPLES

The invention is illustrated more fully below by way of Working Examples and Comparative Examples, although these Examples are not intended to limit the invention.

[Working Example 1]

SiOx (x=1.0) crushed with a jaw crusher (from Maekawa Kogyosho Co., Ltd.) was ground for 2 hours in a ball mill (Makino Corporation), giving SiO particles for which $D_{50}$ was 8 μm. These particles were finely ground in a jet mill (Hosokawa Micron 100 AFG) at an air pressure of 0.58 MPa and a classifier rotational speed of 16,000 rpm, and recovered with a cyclone, giving a silicon powder for which $D_{50}$ was 4.6 μm.

These particles were spread out on a tray to a powder layer thickness of 10 mm, and charged into a batch furnace. While reducing the pressure in the furnace with an oil-sealed rotary vacuum pump, the temperature within the furnace was raised to 1,000° C. at a rate of 200° C./hr. After reaching 1,000° C., 10 hours of carbon coating treatment was carried out by passing methane through the furnace interior at a rate of 0.3 L/min. After stopping the methane, cooling was carried out by lowering the temperature at the furnace interior, giving 106 g of black particles.

The resulting black particles were conductive particles having a BET specific surface area of 4.8 $m^2/g$ and a carbon coating weight, based on the black particles, of 4.8 wt %.

These particles were measured with a laser diffraction-type particle size analyzer (SALD-3100, from Shimadzu Corporation) at a refractive index of 3.90-0.01i, whereupon, in the volume base distribution, the $D_{50}$ (cumulative 50% diameter) was 5.6 μm, the $D_{90}$ (cumulative 90% diameter) was 8.0 μm, and the modal diameter (mode) read off from the graph was 7.1 μm.

<Battery Evaluation>

Next, a battery evaluation using the particles obtained above as the negative electrode active material was carried out as follows.

First, a slurry was prepared by mixing together 45 wt % of the negative electrode material obtained, 45 wt % of synthetic graphite (average particle size, 10 μm) and 10 wt % of polyimide, and adding also N-methylpyrrolidone.

This slurry was coated onto 12 μm thick copper foil and dried for 1 hour at 80° C., then press-formed into an electrode with a roller press, after which the electrode was vacuum dried for 1 hour at 350° C. The dried electrode was subsequently die-punched to a size of 2 $cm^2$, giving a negative electrode.

Next, in order to evaluate the charge-discharge characteristics of the resulting negative electrode, a lithium ion secondary battery for evaluation (test cell) was fabricated using lithium foil as the counterelectrode, using a nonaqueous electrolyte solution obtained by dissolving 1 mol/L of lithium hexafluorophosphate as the nonaqueous electrolyte in a 1/1 (volume ratio) mixture of ethylene carbonate and diethyl carbonate, and using a 30 μm thick polyethylene microporous film as the separator.

The lithium ion secondary battery thus fabricated was left to stand overnight at room temperature, following which a secondary battery charge/discharge tester (from Nagano KK) was used to carry out charging at a constant current of 0.5 $mA/cm^2$ until the test cell voltage reached 0 V. After reaching 0 V, charging was carried out at a reduced current so as to keep the cell voltage at 0 V. Charging was brought to an end when the current value fell to 40 $\mu A/cm^2$. Discharge was then carried out at a constant current of 0.5 $mA/cm^2$. When the cell voltage reached 1.4 V, discharge was ended and the discharge capacity was determined.

The above charge-discharge test was repeated, thereby carrying out a charge-discharge test after 50 cycles on the lithium ion secondary battery (test cell). The results are shown in Table 1. The initial discharge capacity was 1,718 mAh/g and the cycle retention after 50 cycles was 94%, confirming this cell to be a lithium ion secondary battery having a high capacity and excellent cycle characteristics.

[Working Example 2]

The same SiOx (x=1.0) as in Working Example 1 was similarly ground in a ball mill into particles for which $D_{50}$ is 8 µm. In the subsequent jet milling step, the classifier rotational speed was set to 9,000 rpm and a powder for which $D_{50}$ was 6.5 µm was obtained from the cyclone. Carbon coating treatment was carried out in the same way as in Working Example 1, thereby giving conductive particles with a carbon coating weight of 4.9 wt % for which $D_{50}$ was 8.8 µm, $D_{90}$ was 13.8 µm and the modal diameter was 11.0 µm. Using the resulting conductive particles, a negative electrode was fabricated and battery evaluation was carried out in the same way as in Working Example 1.

[Working Example 3]

The same SiOx (x=1.0) as in Working Example 1 was passed through a 1 mm sieve and, below the sieve, was finely ground with the same jet mill as in Working Example 1 at an air pressure of 0.58 MPa and a classifier rotational speed of 5,800 rpm, and recovered with a cyclone, thereby giving particles for which $D_{50}$ was 14.3 µm. Aside from setting the methane flow time to 13 hours, carbon coating treatment was carried out in the same way as in Working Example 1, thereby giving conductive particles with a carbon coating weight of 4.8 wt % for which $D_{50}$ was 14.9 µm, $D_{90}$ was 22.2 µm and the modal diameter was 17.0 µm. Using the resulting conductive particles, a negative electrode was fabricated and battery evaluation was carried out in the same way as in Working Example 1.

[Comparative Example 1]

SiOx (x=1.0) that had been ground into particles for which $D_{50}$ is 8 µm in the same ball mill as in Working Example 1 were furnished to a pneumatic classifier (TC-15, manufactured by Nisshin Engineering Inc.), and classified at an air flow rate of 2.5 Nm³/min and a rotor speed of 3,500 rpm. The $D_{50}$ of particles on the fine product side collected by the cyclone was 3.8 µm.

Carbon coating treatment was carried out in the same way as in Working Example 1, thereby giving conductive particles with a carbon coating weight of 4.9 wt %, and for which $D_{50}$ was 6.0 µm, $D_{90}$ was 10.3 µm and the modal diameter was 7.1 µm. Using the resulting conductive particles, a negative electrode was fabricated and battery evaluation was carried out in the same way as in Working Example 1.

[Comparative Example 2]

The same SiOx (x=1.0) particles that had been finely ground in a jet mill as in Working Example 1 were classified with a pneumatic classifier at an air flow rate of 2.5 Nm³/min and a rotor speed of 10,000 rpm. The $D_{50}$ of particles on the coarse product side collected below the classifier was 5.1 µm. Aside from setting the methane flow time to 13 hours, carbon coating treatment was carried out in the same way as in Working Example 1. The resulting particles were conductive particles with a carbon coating weight of 5.0 wt %, and for which $D_{50}$ was 5.4 µm, $D_{90}$ was 7.7 µm and the modal diameter was 5.7 µm. Using the resulting conductive particles, a negative electrode was fabricated and battery evaluation was carried out in the same way as in Working Example 1.

[Comparative Example 3]

SiOx (x=1.0) particles that had been ground in the same ball mill as in Working Example 1 such that $D_{50}$ was 8 µm were subsequently ground in a wet media mill (OB bead mill, from Eurotec KK) with hexane as the solvent, thereby setting $D_{50}$ to 0.9 µm. Aside from setting the methane flow time to 7 days, carbon coating treatment was carried out in the same way as in Working Example 1. The resulting particles were conductive particles with a carbon coating weight of 5.2 wt %, and for which $D_{50}$ was 2.3 µm, D, was 5.1 µm and the modal diameter was 2.9 µm. Using the resulting conductive particles, a negative electrode was fabricated and battery evaluation was carried out in the same way as in Working Example 1.

The particle sizes and battery characteristics in the Working Examples and Comparative Examples are shown collectively in Table 1. The Comparative Examples were confirmed to be lithium ion secondary batteries for which, compared with lithium ion secondary batteries produced using the negative electrode materials in the Working Examples, the cycle characteristics were clearly inferior.

TABLE 1

| | | $D_{50}$ (µm) | $D_{90}$ (µm) | Modal diameter (µm) | (Modal diameter − $D_{50}$)/ $D_{50}$ | ($D_{90}$ − Modal diameter)/ $D_{90}$ | Initial charge-discharge capacity (mAh/g) | Retention after 50 cycles (%) |
|---|---|---|---|---|---|---|---|---|
| Working Example | 1 | 5.6 | 8.0 | 7.1 | 0.27 | 0.11 | 1,718 | 94 |
| | 2 | 8.8 | 13.8 | 11.0 | 0.25 | 0.20 | 1,735 | 93 |
| | 3 | 14.9 | 22.2 | 17.0 | 0.14 | 0.23 | 1,731 | 90 |
| Comparative Example | 1 | 6.0 | 10.3 | 7.1 | 0.18 | 0.31 | 1,720 | 88 |
| | 2 | 5.4 | 7.7 | 5.7 | 0.06 | 0.26 | 1,701 | 87 |
| | 3 | 2.3 | 5.1 | 2.9 | 0.26 | 0.43 | 1,660 | 82 |

The invention claimed is:

1. A negative electrode material for use in a lithium ion secondary battery, comprising silicon-containing particles which are capable of intercalating and deintercalating lithium ions and are characterized by having a volume base particle size distribution, as measured with a laser diffraction-type particle size analyzer, wherein
   $D_{50}$ is from 0.5 to 10 µm,
   $D_{90}$ is from 5 to 15 µm,
   (modal diameter—$D_{50}$)/$D_{50}$=0.15 to 0.50 and
   ($D_{90}$—modal diameter)/$D_{90}$=0.05 to 0.20, wherein
   $D_{50}$ is the cumulative 50% diameter, and
   $D_{90}$ is the cumulative 90% diameter.

2. The negative electrode material for a lithium ion secondary battery of claim 1, wherein the silicon-containing particles which are capable of intercalating and deintercalating lithium ions are silicon particles, particles having a composite structure of silicon fine particles dispersed in a silicon compound, silicon oxide particles of general formula SiOx (wherein 0.5<x<1.6), or a mixture thereof.

3. The negative electrode material for a lithium ion secondary battery of claim 1 which is characterized by comprising coated particles that are silicon-containing particles which are capable of intercalating and deintercalating lithium ions and are covered on surfaces thereof with a carbon coat.

4. The negative electrode material for a lithium ion secondary battery of claim 3, wherein the coated particles that are silicon-containing particles which are capable of intercalating and deintercalating lithium ions and are covered on surfaces thereof with a carbon coat are obtained by chemical vapor depositing carbon onto silicon-containing particles capable of intercalating and deintercalating lithium ions, in an atmosphere of an organic gas and/or vapor capable of thermally decomposing to produce carbon and within a temperature range of 600 to 1,200° C., to form a carbon coat.

5. The negative electrode material for a lithium ion secondary battery of claim 4, wherein a precursor of the organic gas capable of thermally decomposing to produce carbon is one or more selected from the group consisting of methane, ethane, ethylene, acetylene, propane, butane, butene, pentane, isobutane, hexane, benzene, toluene, xylene, styrene, ethylbenzene, diphenylmethane, naphthalene, phenol, cresol, nitrobenzene, chlorobenzene, indene, coumarone, pyridine, anthracene, phenanthrene, and gas light oil, creosote oil, anthracene oil and naphtha cracking tar oil obtained in tar distillation operations.

6. A negative electrode for a lithium ion secondary battery, which negative electrode is characterized by using the negative electrode material for a lithium ion secondary battery according to claim 1.

7. A lithium ion secondary battery which is characterized by using the negative electrode for a lithium ion secondary battery of claim 6.

8. The negative electrode material for a lithium ion secondary battery of claim 1, wherein modal diameter is from 5 to 20 μm.

9. The negative electrode material for a lithium ion secondary battery of claim 1, wherein
(modal diameter—$D_{50}$)/$D_{50}$=0.25 to 0.50 and
($D_{90}$—modal diameter)/$D_{90}$=0.11 to 0.20.

10. The negative electrode material for a lithium ion secondary battery of claim 1, wherein modal diameter is from 5 to 20 μm.

* * * * *